United States Patent [19]

Hill

[11] 4,200,867
[45] Apr. 29, 1980

[54] SYSTEM AND METHOD FOR PAINTING IMAGES BY SYNTHETIC COLOR SIGNAL GENERATION AND CONTROL

[76] Inventor: Elmer D. Hill, 6498 Surfside, Sacramento, Calif. 95831

[21] Appl. No.: 893,102

[22] Filed: Apr. 3, 1978

[51] Int. Cl.² .......................................... G06K 15/20
[52] U.S. Cl. .................................. 340/703; 273/85 G; 340/709; 340/724; 340/744; 340/798; 358/903
[58] Field of Search ................ 340/703, 709; 358/903

[56] References Cited

U.S. PATENT DOCUMENTS

| | | | |
|---|---|---|---|
| 3,531,796 | 9/1970 | Kiesling | 340/324 A |
| 3,668,687 | 6/1972 | Hale | 340/324 A |
| 3,771,155 | 11/1973 | Hayashi et al. | 340/703 |
| 3,854,130 | 12/1974 | Ligocki | 340/703 |
| 3,978,470 | 8/1976 | McGuire | 340/703 |
| 4,026,555 | 5/1977 | Kirschner et al. | 358/903 X |
| 4,121,283 | 10/1978 | Walker | 340/703 X |

OTHER PUBLICATIONS

E. D. Hill, "Synthetic Color Signal Generation and Control for TV Games and Other Simple Applications", 1976 Wescon Professional Program, Sep. 14–17, 1976, 17 pp.

*Primary Examiner*—David L. Trafton
*Attorney, Agent, or Firm*—Townsend and Townsend

[57] ABSTRACT

Color video images are remotely painted on the screen of a conventional color television receiver or a video monitor utilizing electronic color image storage means in a control device. The control device comprises a manual input unit, an image or picture element memory, a palette or color memory controllable independently of the image memory, and color television signal generating circuitry. The system includes further features enabling an artist to record and to recreate the painted images. In one embodiment, relatively high resolution is achieved with minimal staining of adjacent image portions.

38 Claims, 10 Drawing Figures

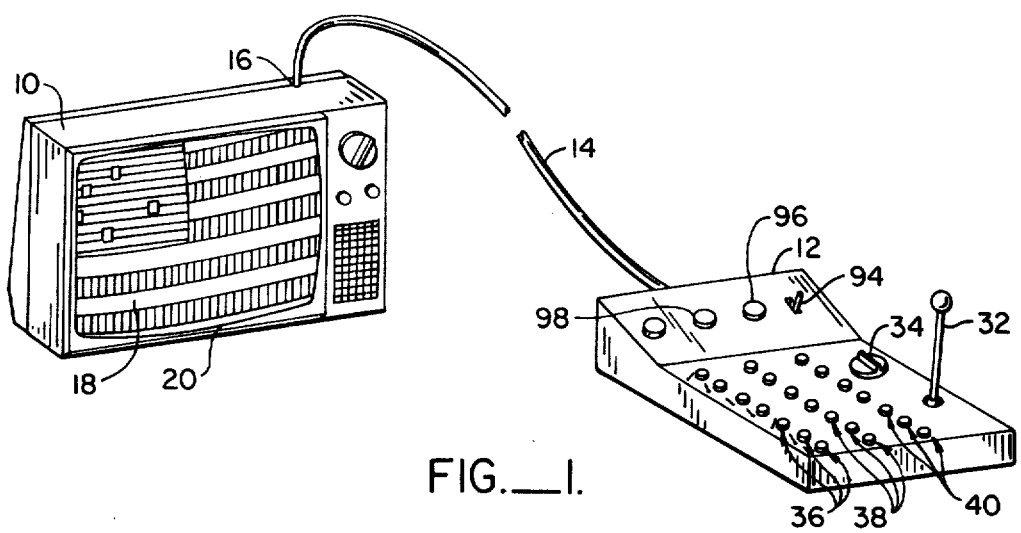
FIG._1.
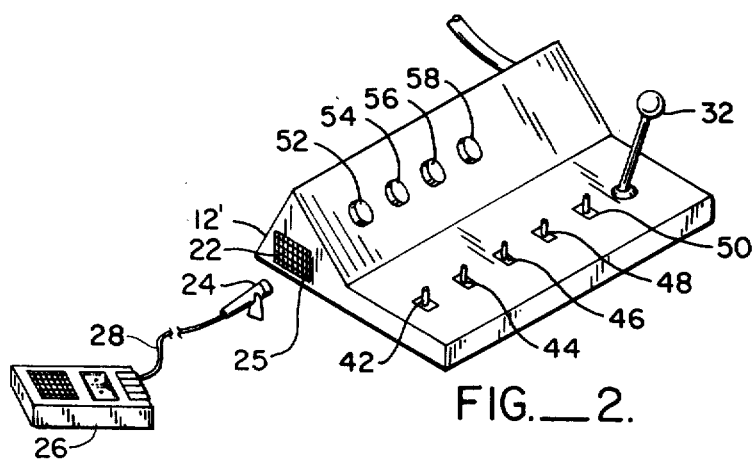
FIG._2.
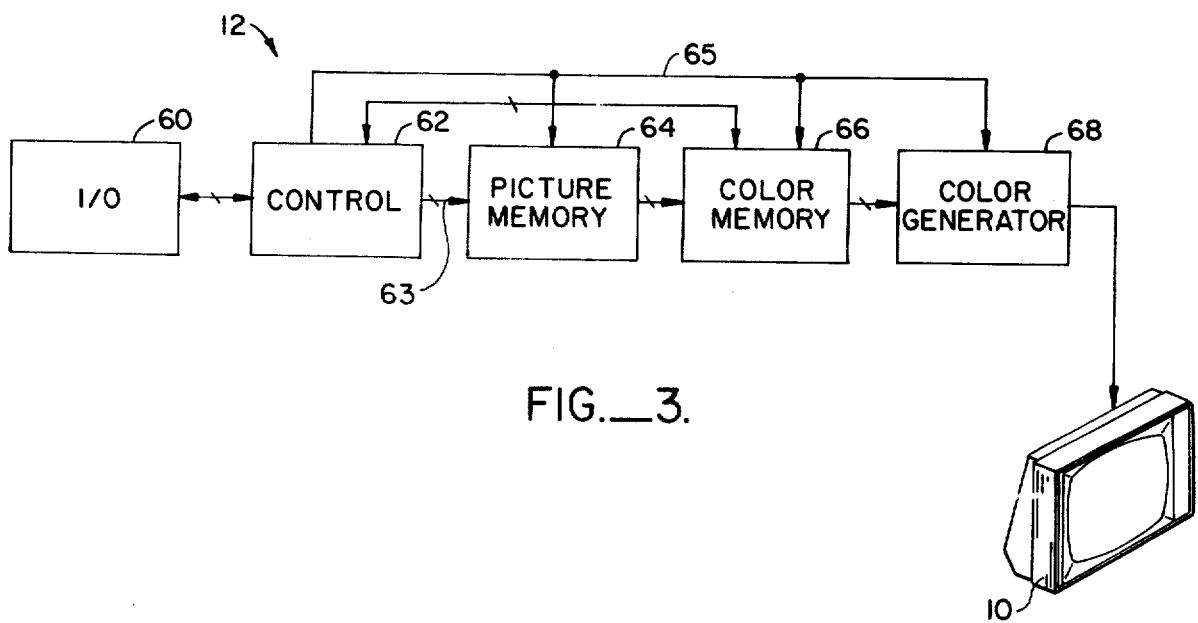
FIG._3.

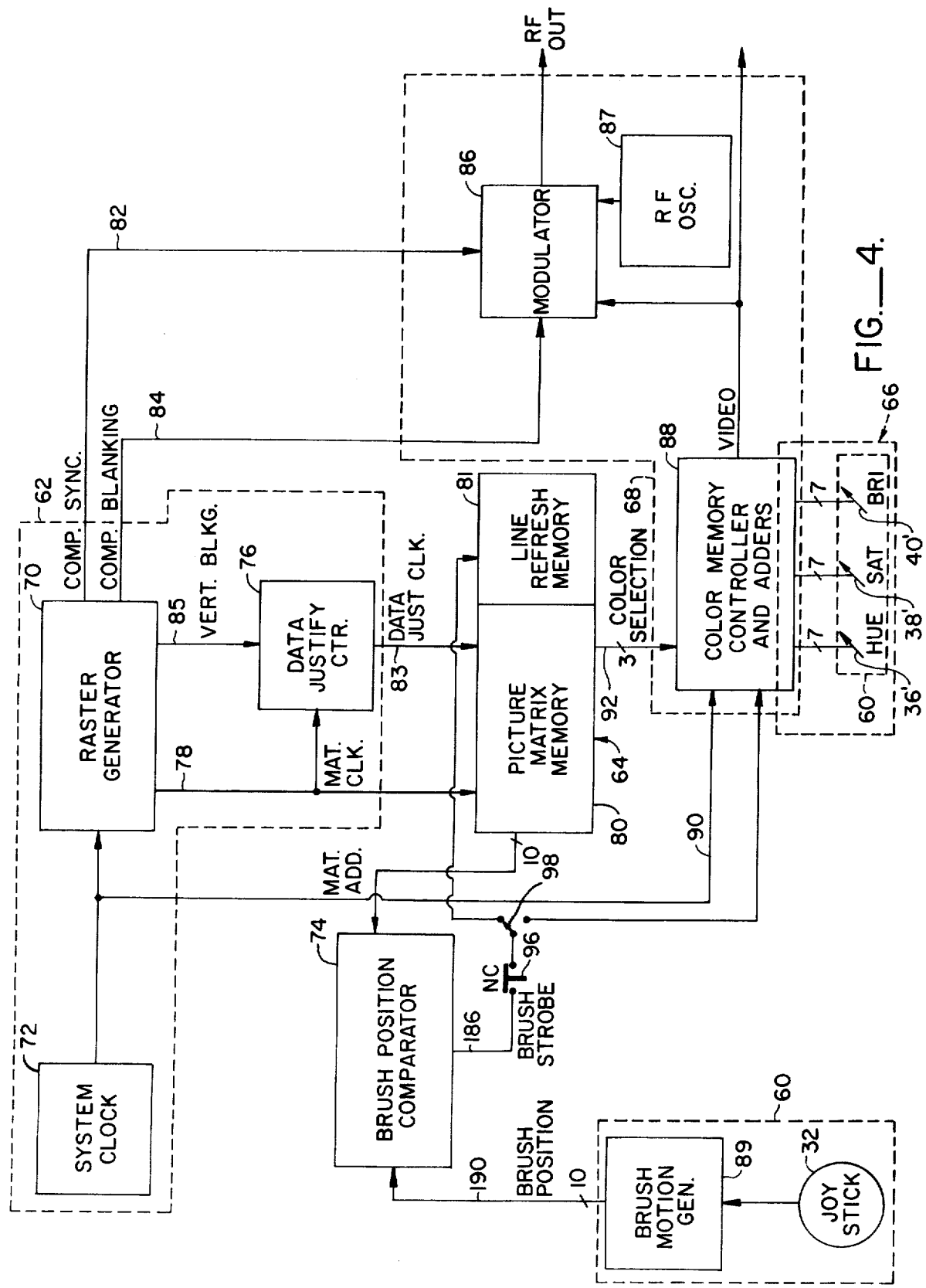

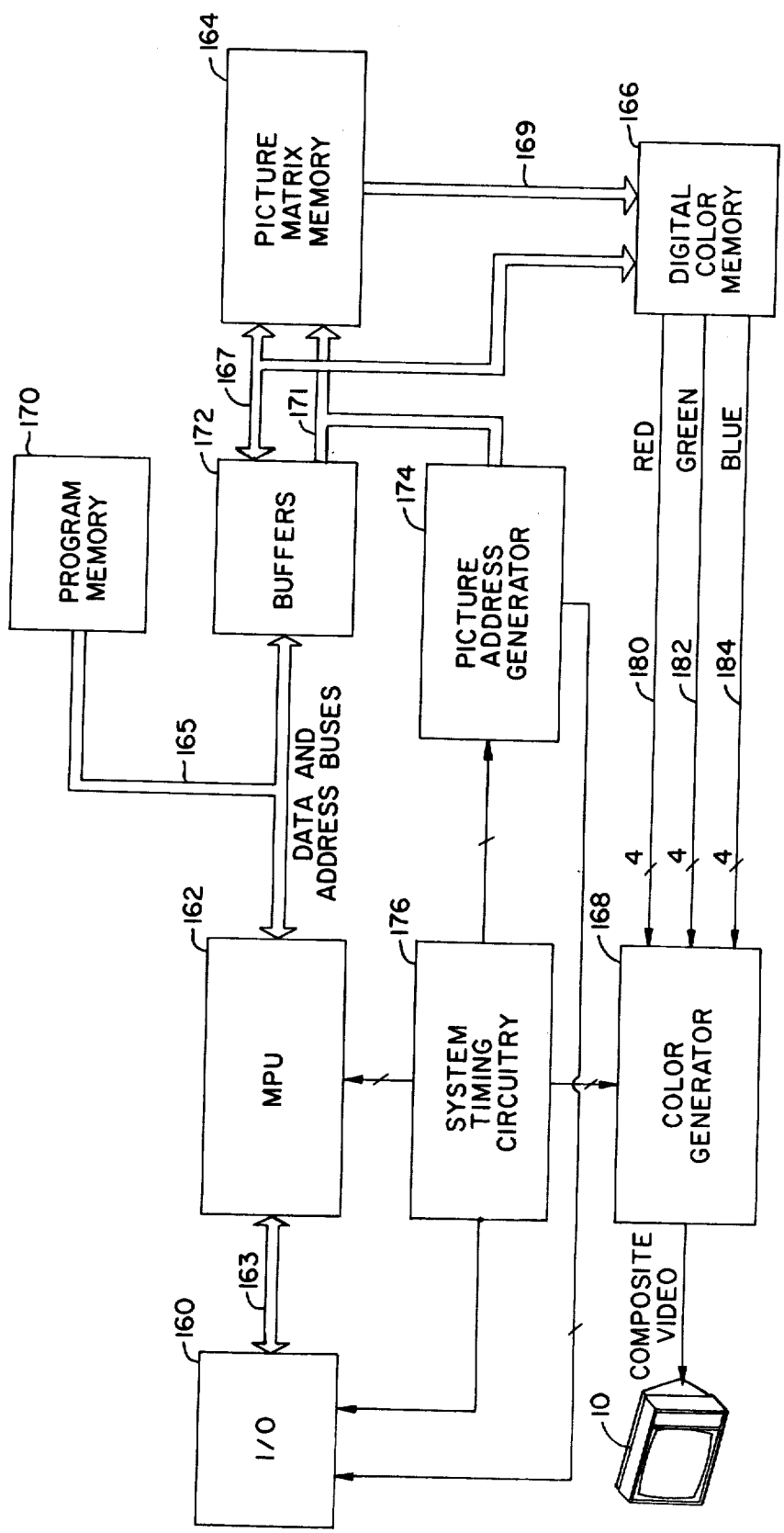
FIG._5.

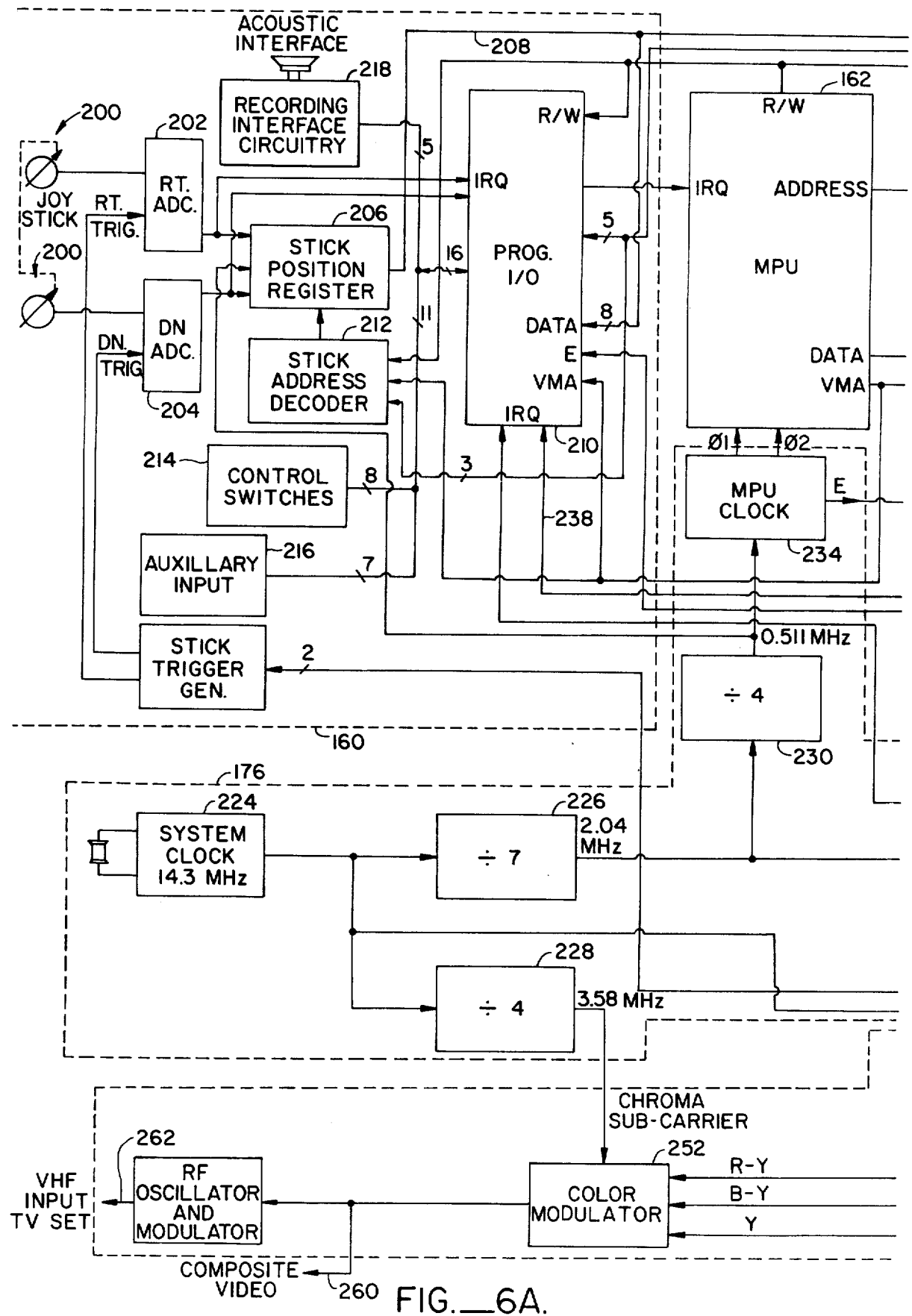
FIG._6A.

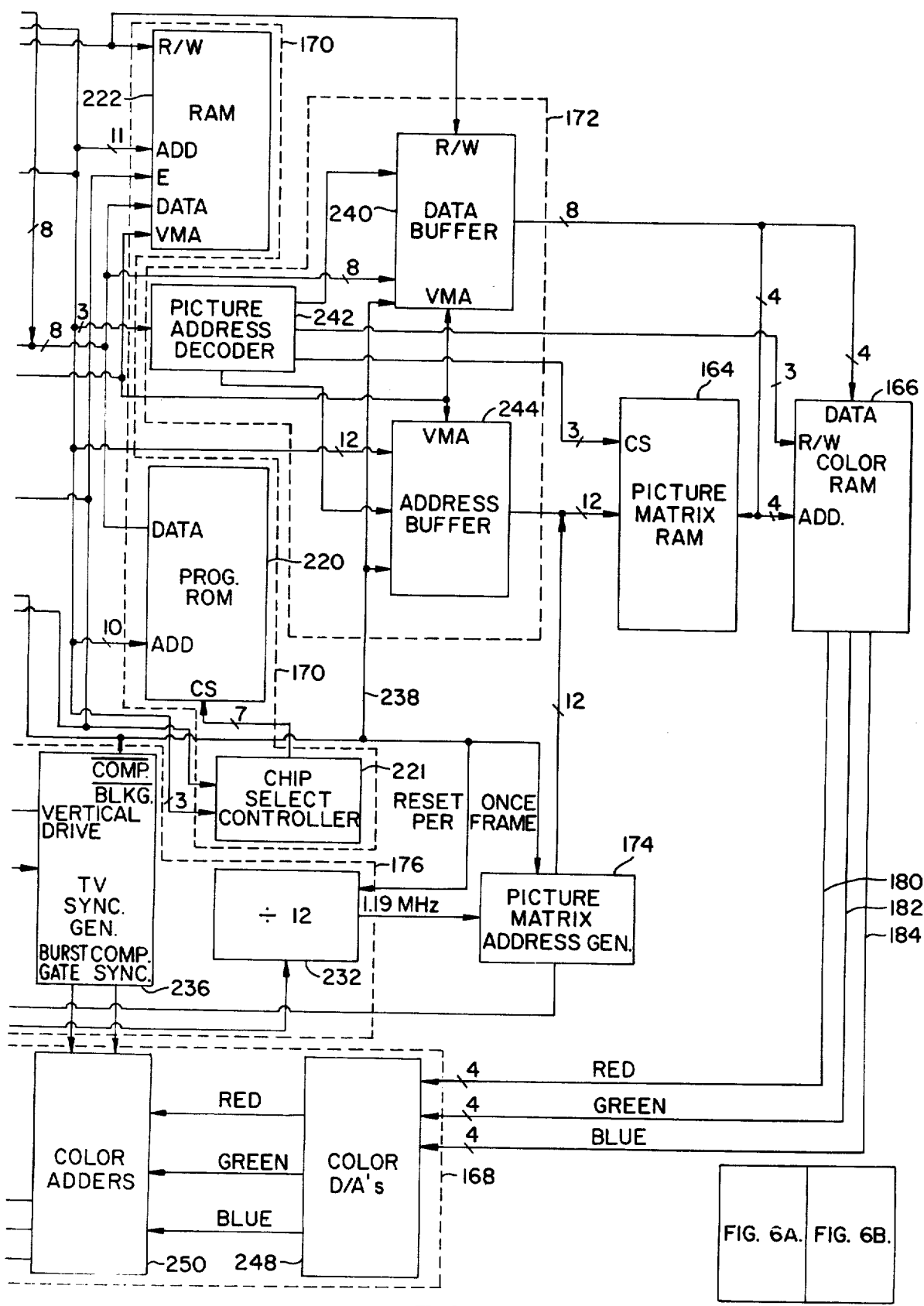
FIG._6B.
FIG._6C.

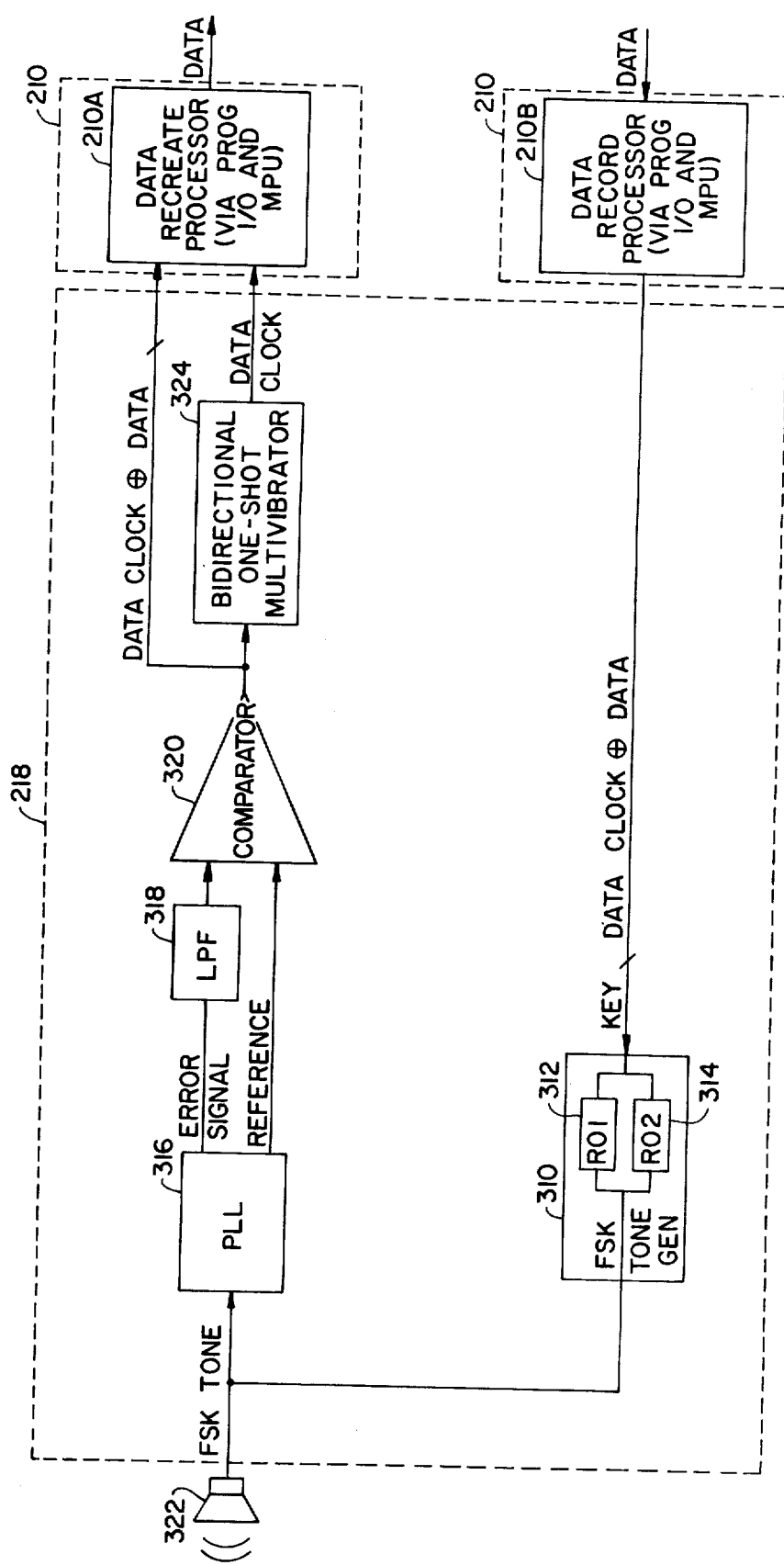
FIG._7.

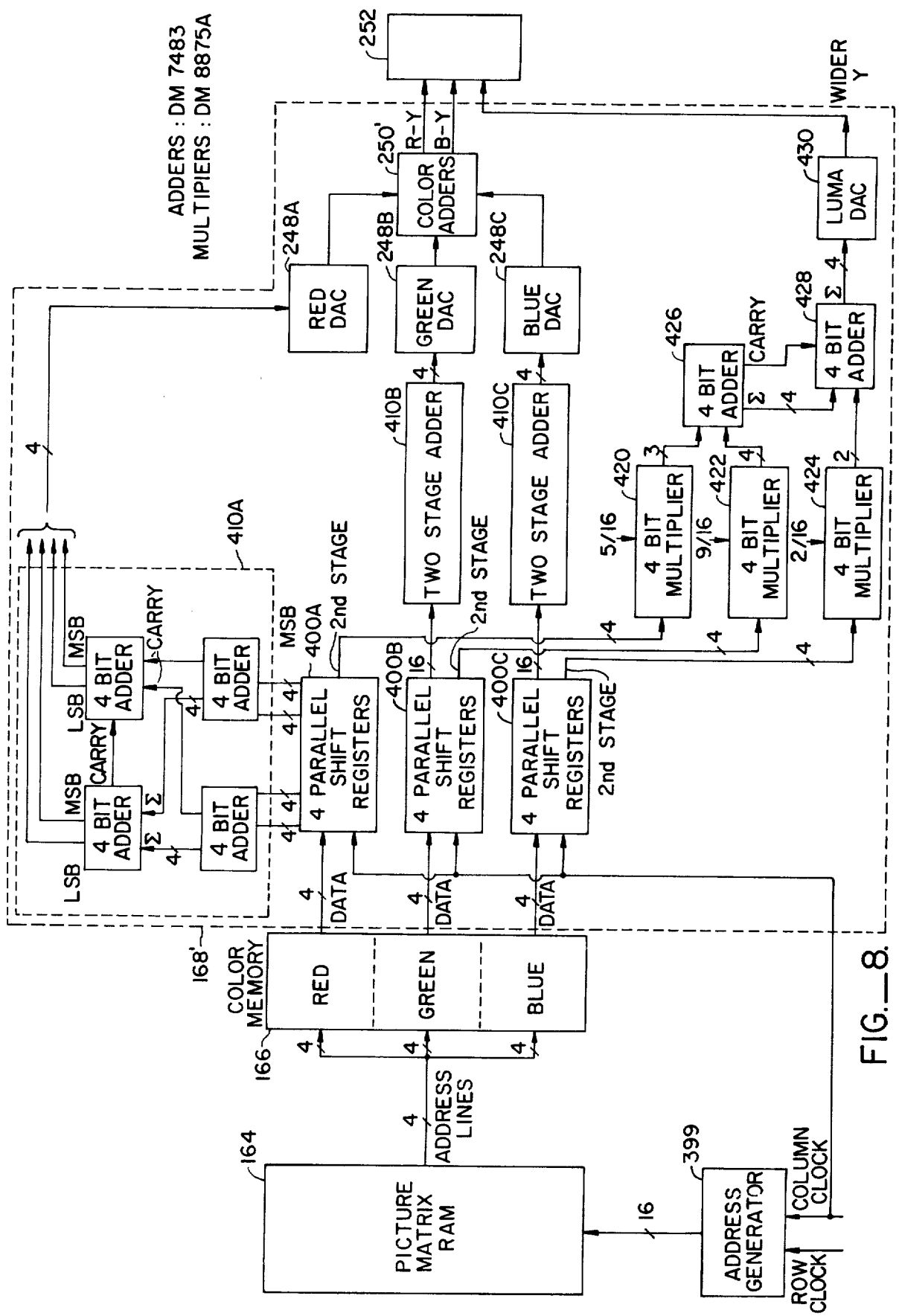

SYSTEM AND METHOD FOR PAINTING IMAGES BY SYNTHETIC COLOR SIGNAL GENERATION AND CONTROL

BACKGROUND OF THE INVENTION

I. Field of the Invention

This invention relates to home entertainment devices and particularly to color video image generation and display simulating an artist's painting.

II. Description of the Prior Art

Video graphic display devices are well known in the computer arts. Relatively sophisticated graphic display devices which interface with large or medium-sized computers through a keyboard have long been employed, and they find wide application in data processing and information display. However, the expense and sophistication of the computer-based systems with which graphic display devices have been employed as well as the sophistication and data storage requirements believed to be necessary to generate video displays, especially color video displays, has substantially limited use to scientific, technical and commercial applications, such as graphic design and information retrieval.

Relatively inexpensive interactive video display devices have recently been introduced for home and arcade entertainment. A representative patent describing the technology is U.S. Pat. No. Re. 28,507, dated Aug. 5, 1975. Microprocessor-based video entertainment devices have also been developed for home and arcade entertainment including color display features. However, such entertainment devices embody a design philosophy exclusively directed to the implementation of simulated competitive games, usually involving the striking of a moving object such as simulated tennis, hocky, football, baseball and warfare. To date, no system has been designed which permits a human user to remotely paint a multi-color video image from a font of user-mixed colors in the manner of a brush artist.

SUMMARY OF THE INVENTION

The invention comprises a home entertainment system which synthesizes color images in a manner simulating the use of the palette of an artist, thereby permitting a user to remotely paint pictures on a conventional television screen. As such the invention is embodied in a new artistic medium. The apparatus according to the invention comprises an input unit including a joystick, an image or picture element memory, a palette or color memory controllable independently of the image memory, and color television signal generating circuitry. The palette is either an analog or a digital signal memory device which is operative to store a value representing a source color and specifically all of the components of a source color, such as hue, saturation and brightness or red, green, and blue color values. The image memory is a digital signal memory device which is arranged in a matrix corresponding to coordinates on the viewing screen in general in cartesian coordinates derived from a standard television raster image.

In operation, a color index or "pointer" is selected by the input unit which in turn generates signals which are stored in the image memory. The image memory registers the color index in its matrix without reference to the actual color value. Instead, the index identifies the color to be generated at the selected matrix location. The color television signal generating circuitry decodes the value of the identified color and synthesizes an image as a synchronous signal provided to a television receiver or video monitor.

The image generator according to the invention includes a number of features enhancing the practical utility of the apparatus. An image is generated on the image viewing screen by a "brush" which is controlled by a remote joystick controller. In order to identify the current location of the static brush, a mechanism is provided to cause the current brush location to be displayed. The display is preferably of a blinking or flickering at the current brush location on the screen.

As an aid to blocking in large areas of color simultaneously, the brush control mechanism includes the capability of increasing the effective size of the brush location. The brush shape is preferably an "L", thus extending both the vertical and the horizontal sweep of the brush during use.

The apparatus further includes a capability for separately displaying all available colors simultaneously, called a palette, for adjustment of the color values. The available colors may be displayed overlaid on the image during image generation without affecting the final image, and the selected brush color is preferably displayed distinctly from other colors in the palette.

The apparatus includes a capability of electronically recording and subsequently reproducing a signal representation of an image with virtually any inexpensive tape recorder by means of simple acoustical coupling.

A particular preferred embodiment of a color memory system has an image matrix with a resolution approaching the resolution of conventional color television yet which is transmitted within the bandwidth limitations imposed by broadcast television standards. The preferred memory system digitally computes a color average of fixed transient response time. The average is used to drive digital to analog converters which generate the displayed television signal.

The use of two memories to synthesize a color image has numerous advantages. First of all, it allows the use of less expensive memory components of smaller memory capacity. Second, it enhances the throughput and thereby the resolution of the matrix without adding substantially to the overall system cost. Third, the use of a separate color memory enables all colors identified by a single index to be modified simultaneously withough disturbing the contents of the picture matrix memory. Fourth, in band limited data transmission between subsystems, the use of a separate memory reduces the bit rate required to fully describe each picture element.

The palette display and remote brush blinker feature of the invention greatly enhances the practical utility of the invention in a more natural man-machine interface. In the high resolution embodiment herein described, the digital averaging and fixed transient feature prevents color staining of adjacent displayed memory locations.

Other advantages and object of the invention will be set forth in the following detailed description taken in conjunction with the accompanying drawings.

BRIEF DESCRIPTION OF THE DRAWINGS

FIG. 1 is a perspective view of a first embodiment of the invention.

FIG. 2 is a perspective view of the second embodiment of the invention.

FIG. 3 is a block diagram view of system according to the invention.

FIG. 4 is a detailed block diagram view of the first embodiment of the invention.

FIG. 5 is a block diagram view of a second embodiment of the invention.

FIGS. 6A and 6B are together a detailed block diagram in partial schematic of the second embodiment of the invention.

FIG. 6C illustrates the manner in which FIGS. 6A and 6B relate.

FIG. 7 is a block diagram of an image record and recreate feature of the invention.

FIG. 8 is a block diagram of a modification to the embodiment of FIG. 6 for producing high resolution images.

DETAILED DESCRIPTION OF PREFERRED EMBODIMENTS

According to the invention, a manual image generating system is provided which, in conjunction with a conventional television receiver, or video monitor, electronically reproduces colored images created by an artist manipulating an electronic paint brush and a palette of colors. A principal feature of the invention is an electronic palette or color memory which is controllable independently of an image storage device or picture memory. Two principal embodiments described herein differ principally in the form of color memory. In one embodiment, an analog form of color memory is utilized. In a second embodiment, a digital form of color memory is utilized together with a microprocessor interface control with a picture memory. Alternatively, discrete logic may be used for interface control. In addition, means are provided for recording the image on magnetic tape through an acoustic audio coupling which can be used with any conventional audio recorder such as a tape recorder.

Turning to FIG. 1, the principal components of one embodiment of the television manual image generating system are illustrated pictorially. The system comprises a television receiver 10, a control unit 12 and means 14 for connecting the control unit 12 to the receiver 10. The receiver 10 may be any of the standard commercially available color television receivers provided with antenna input terminals 16. The connecting means 14 may be a twin lead or cable and is preferably a shielded coaxial cable appropriately matched to the impedance of the input terminals 16. Alternatively, the output signal may be a composite video signal, and the display device may be a television monitor. The present invention is described as it would be amenable to cost critical applications such as video recreational products for the consumer market. However, the novel features of the invention can be extended to the synthesis of color graphic displays by suitably modifying the memory size, bandwidth and system interface.

The controller 12 comprises a console with various control input devices on the face thereof. The control devices generally include an x-y analog proportional movement transducer or joystick 32, a color selector switch 34 and color palette controls 36, 38 and 40. The control unit 12 is capable of generating signals for producing a set of colors, each color corresponding to a "well" of an artist's palette. The control unit 12 presents the user the manual control functions for the "wells" in a variety of ways. For example, the "wells" may comprise a bank of knobs, with three knobs corresponding to the independent components of the color vector of each "well" of the electronic palette, namely hue, saturation, and luminance or brightness. Alternatively, the knobs could represent additive primary colors such as red, green and blue. In the invention described in FIG. 1, palette "well" controls 36, 38 and 40 provide hue, saturation and brightness control for seven "wells" of color.

FIG. 2 illustrates an alternative embodiment of the controler 12'. In addition to a joystick 32 the control interface may comprise five double throw center-off switches 42, 44, 46, 48 and 50, and four push buttons 52, 54, 56 and 58. Three of the double throw switches 42, 44 and 46 control adjustment of the primary colors, red, green and blue. Switch 50 controls the mode of operation of the joystick 32, i.e., between "paint" and "sketch" mode. The paint mode causes a stored image change, while the sketch mode causes a transient change which is displayed but not stored. Push button 52 provides either a display of the image or a momentary display of palette colors superimposed on the color image. The other switches are provided for other selective operations of the controller 12', such as "one color" (switch 54) a function which "paints" the entire display screen with the selected color, "record" (switch 56) and "recreate" (switch 58), and "palette" (switch 52), as hereinafter explained.

In order for the user to produce an image, he merely selects the color (switch 48) which is adjusted to taste (switches 42, 44, 46), and then manipulates the joystick 32 to "draw" a swath of color onto the screen 18. The user, like a brush and paint artist, has complete flexibility in color adjustment and in image placement. The user may select the palette mode (switch 52), "mix" the colors with switches 42, 44 and 46, and then paint with the freedom of a brush artist.

In addition, means are provided for recording the image 18 which is created and displayed on the screen 20 of receiver 10. The image recording means comprises a recording controller 22 internal to the cabinet of display controller 12, pickup 24 (a microphone) and an audio recorder 26 such as a conventional cassette recorder. The pickup 24 is coupled through a shielded cable 28 to the recorder 24, which records an audio frequency representation of the color video image. The recording controller may also include an input means 25 such as a microphone for receiving the recorded signal and recreating the recorded image. These functions may be controlled by the record and recreate switches 56 and 58.

THEORY OF OPERATION

The theory of electronic painting as herein described is now set forth.

Referring to FIG. 3, there is shown a block diagram of the basic system. The system comprises an input/output (I/O) unti 60 coupled to a control unit 62. Control unit 62 is coupled through a bus 63 to a picture memory 64 and to a color memory 66 and through timing lines 65 to the picture memory 64, to the color memory 66 and to a color generator 68. The picture memory 64 is functionally coupled through the color memory 66 to the generator 68. The I/O unit 60 comprises the manual controls such as the joystick, switches and/or manually adjustable potentiometers illustrated in either FIG. 1 or FIG. 2. The control unit 62 includes basic timing and synchronization circuitry for all subsystems.

FIG. 4 illustrates a first embodiment described briefly in connection with FIG. 1. The embodiment of FIG. 4 is characterized by a digital picture memory 64 and an analog color memory 66. The picture memory 64 comprises an array of dynamic shift registers in a picture matrix memory 80 and in a line refresh memory 81. The picture matrix memory 80 is a 1024×3 bit dynamic shift register. (Alternatively, a random access memory (RAM) may be used.) The analog color memory 66 comprises an array of seven potentiometer stacks of three potentiometers 36', 38' and 40' with associated circuitry.

As hereinafter explained, the setting of each potentiometer determines the analog value of the color to be reproduced.

According to the invention, memory locations of the picture matrix memory 80 are associated with unique locations or picture elements (pixels) of a video image. The digital values in each matrix memory location merely index or point to one of eight unique color values stored in the color memory 66, the values of which are conveyed, upon signal, to the color generator 68. The color generator 68 processes the values to create a composite video signal to be conveyed to input terminals of a television monitor.

The following is a description of the various subsystems and their operation.

ANALOG MEMORY VERSION

Referring to FIG. 4, the control unit 62 comprises a raster generator 70, a system clock 72 and a data justifying counter 76. The system clock 72 is coupled to each of the subsystems of controller 12 and is, for example, operative to produce clock pulses at the NTSC standard chrominance subcarrier frequency, specifically 3.579545 MHz. The raster generator 70 generates a 262 line non-interlaced synchronization format by dividing the basic clock frequency by 228 to produce horizontal line time and by further dividing the frequency of the horizontal line time by 262 to produce vertical timing synchronization.

Each image is generated by horizontally scanning 240 lines separated by equal vertical intervals. A vertical blanking interval consuming a total of 22 lines is set aside for synchronization and other functions as hereinafter explained. Horizontal blanking is selected to consume approximately 10 microseconds. A further clock signal, designated the matrix clock output 78, is derived from the raster generator 70 and provided to the data justifying counter 76 and to the picture matrix memory 80 of the picture memory 64.

In the operation of the raster generator 70, two signals are produced during each horizontal blanking interval of a picture generating sequency (or line). During the first half of each horizontal blanking interval, a horizontal composite synchronization pulse is generated and fed to the composite sync line 82. During the second half of each horizontal blanking interval, a reference color burst pulse is generated in color controller 88 and applied to modulator 86. At the end of the active picture portion of frame, i.e., after all lines have been displayed and the cycle is ready to repeat, but during the vertical blanking interval between active picture portions, a vertical synchronization pulse is provided to sync line 82.

The vertical synchronization pulse generally has a duration of three to four horizontal lines. During the vertical synchronization interval, color bursts are eliminated and horizontal synchronization pulses are lengthened by approximately ten times. In addition, composite blanking signal are provided through blanking line 84 for the duration of the blanking intervals. During transmission of the blanking signals, the luminance signal output is clamped to the black, or zero, signal level to prevent interference of chrominance signals with synchronization signals. Both the composite sync line 82 and the composite blanking line 84 are coupled to the radio frequency modulator 86 which forms a part of the color generator 68 hereinafter explained.

The picture matrix memory 80 stores the picture data in a recirculating sequence. The picture data requires 768 locations of memory.

In the present embodiment a 1024(1K) location memory of 3 words is utilized. The picture data is thus 256 stages short of exiting the shift registers at the end of the active picture portion of the frame. In order to advance the data through picture matrix memory 80, a data justification counter 76 activates a data justification clock via line 83 during the vertical blanking interval as signaled through line 85 from the raster generator 70. The data justification clock 83 thereupon advances the data serially through the memory until the data is ready to emerge. The rate of the clock 83 is proportioned so that data is justified in the time available to minimize data retention problems due to excessive hold times. This generally means that the clock is slowed relative to the matrix clock 78.

To avoid a requirement to store redundant information in picture memory 64, having fewer vertical elements than storage location in the matrix, a line refresh memory 81 is provided. The refresh memory 81 is operative to recirculate identical data to make up the vertical dimension of the resolution cell. Where a 32 by 24 matrix is employed, the line refresh memory 81 is operative to recirculate data for 10 lines to achieve the 240 line output of the video image.

The picture memory 64 includes within its subsystem a 10-bit register (not shown) which is used to define the instantaneous matrix address of the resolution cell data being transmitted. In operation, the five least significant bits (LSB) are clocked at the matrix clock rate, and the five most significant bits (MSB) are clocked at 1/10th of the matrix clock rate. The five LSBs define the column clock and the five MSBs define the row clock. The column clock signal is derived from the master clock signal through a divide by 6 counter (not shown) and the row clock is provided though a synchronous divided by 10 counter driven by the row clock.

The line refresh memory 81 is used to enter new data into the picture matrix memory 64. New data is derived from the 10 bit brush position comparator 74, which generates a strobe signal through line 186 to line refresh memory 81. In operation, the strobe signal persists for the duration of one resolution cell and is repeated for each line scan during composition of that particular cell. In this manner, the brush "stroke" is used to selectively load new data into the picture matrix memory 80.

Brush position comparator 74 is under the control of the I/O device 60. The I/O device 60 comprises joystick 32 coupled to a brush motion generator 89. The joystick generates analog signals in response to change in azimuthal position. These signals are provided to a brush motion generator 89 which comprises two analog-to-digital converters (ADC), one for converting motion in the horizontal direction to a five-bit digital value and the other for converting motion in the vertical direction to a five-bit digital value. A brush register (not shown) within the generator 89 temporarily stores the horizontal position value as the five least significant bits and the vertical position value as the five most significant bits.

The design of each of the generator ADCs is identical. Both comprise relaxation oscillators whose outputs are connected to binary counters each of which forms half of the brush position register. In operation, the relaxation oscillators are gated on only during the vertical blanking period such that the brush position register 74 contains a count at the completion of the vertical blanking period which is proportional to the frequency of the corresponding relaxation oscillator. The signals from the joystick 32 are derived from potentiometers associated with each axis of the joystick 32. The potentiometer forms a part of a resistance- capacitance timing network defining the time constant of the relaxation oscillator. The period of oscillation of the relaxation oscillator is therefore directly proportional to the potentiometer position.

Multiple position switch 34 (FIG. 1) is used to select the color to be painted from among the palette colors. Specifically, each position of the multiple position switch 34 corresponds to the combined selection of one hue palette control 36, one saturation palette control 38, and one luminance palette control 40. The position of the respective palette controls 36, 38 and 40 determines a resistance value of a potentiometer stack 36', 38', 40' (FIG. 4) of color memory 66. The resistance value of the individual potentiometers comprising the stack are directly proportional to hue, saturation and luminance information and are therefore adjustable to the user's taste independent of image location.

The color generator 68 incorporates a modulator 86 and radio frequency oscillator 87 with a color memory controller and adder 88 (FIG. 4). The circuitry of subsystem 88 shares common circuitry with color memory 66 such that it derives signals from potentiometers 36', 38', 40' to generate a composite video signal.

Chrominance signal generation is carried out in three phases corresponding to the generation of the hue, saturation, and luminance information forming the three components of the color vector. Unit 88 includes a "one-shot" multivibrator (not shown) which is triggered once every cycle of system clock 72 through line 90. This first "one-shot" multivibrator in turn is coupled to a second "one-shot" multivibrator (not shown). Hue adjustment is provided by varying the period of the first one-shot multivibrator while in turn triggers the second multivibrator which is operative to generate a symmetric square wave at the system clock frequency, the phase of the second multivibrator being controlled by the variable period delay for the first multivibrator.

The selected hue adjustment potentiometer 36' is operative to control a variable period delay of the first multivibrator of unit 88 during all periods of color generation, except during the reference color burst the potentiometer 36' is shunted such that the first multivibrator generates its minimum time delay signal.

An "L pad" type attenuator (not shown) is included in unit 88 to effect saturation adjustment. Saturation adjustment is the amplitude control of the chrominance signal. The selected saturation adjustment potentiometer 38' forms the shunt leg of the "L pad" attenuator.

Similarly, an "L pad" type attenuator (not shown) is provided in unit 88 to control luminance information, the luminance potentiometer 40' forming the shunt leg of the "L pad". The luminance information is provided as follows: during blanking periods, a black level in the video signal is set. At all other times the selected luminance potentiometer 40' establishes an instantaneous DC level which is conveyed on the video signal.

The particular combination of luminance, chrominance and hue values which are transmitted in the video signal is selected electronically by transistor switches (not shown) activating the hue, saturation and luminance adjustment. The picture matrix memory 80 is scanned electronically to activate three signal lines 92, which are binary coded to activate one set of hue, saturation and luminance control in unit 88, that is, the signal lines 92 are decoded so as to select the particular color control potentiometer identified by the unique address thereof in the picture matrix memory 80.

The luminance signal and the chrominance signal are added by means of a resistance capacitance network (not shown) and applied as a video signal to modulator 86. An r.f. oscillator 87 provides a carrier signal to modulator 86. The source of the radio frequency signal may be a simple one-transistor oscillator circuit (not shown) of conventional design arranged to oscillate at either 61.25MHz or 67.25MHz. A front panel switch or the like, such as switch 94 (FIG. 1), is provided to select the frequency of oscillation and thus the channel. Modulator 86 comprises a suitably biased diode arranged to conduct more heavily in a forward direction and thereby to transmit more radio frequency signals for video signals which approach the DC level of composite synchronization pulses provided through signal line 82. The consequently modulated radio frequency signal is fed to a radio frequency filter/transformer (not shown) or the like which in turn provides appropriate impedance transformation to make the modulate radio frequency signal available to the input of a standard television receiver.

In order to assist the artist in visualizing the colors to be reproduced, suitably arranged switches are provided to synthesize a persistant brush strobe of one color ("one color" mode). For example, a switch control 96 (FIG. 1 and FIG. 4) may override the output of the brush strobe line 186 to synthesize a persistent brush strobe which blankets all memory locations of the color memory 64 with the same color index. Switch control 96 is therefore useful in painting backgrounds.

A "sketch" mode control switch 98 (FIG. 1 and FIG. 4), initiates signals which directly control the color selection 92, without disturbing the composite image stored in the picture matrix memory 80. When used in conjunction with the one color button control 96, the sketch mode controller 98 may be used to preview a color selection of the entire displayed image without disturbing the composite image stored in picture memory 80.

DIGITAL MEMORY VERSION

Turning now to FIG. 5, there is shown an embodiment of a manual image generator or video controller 12' (FIG. 2) characterized by use of a programmable control system and an addressable digital color memory. In block diagram form, the controller 12' comprises an I/O unit 160, a programmable microprocessing unit (MPU) 162, a picture matrix memory 164, a digital color memory 166, a color generator 168, a program memory 170, buffers 172, a picture address generator 174 and system timing circuitry 176.

The I/O unit 160 is coupled in synchronous interface with the MPU 162 through a bus 163. Data and address busses 165 link MPU 162 with program memory 170 and buffers 172. Buffers 172 are in turn coupled through data bus 167 and address bus 171 to the picture matrix memory 164. The data bus 167 is also coupled to the address input and data input of the color memory 166. System timing circuitry 176 provides timing control to the MPU 162, the picture address generator 174 and the color generator 168. The picture address generator 174 is coupled through address bus 171 to the picture matrix memory 164. The picture matrix memory output data is coupled through bus 169 to the address input of the digital color memory 166. Color memory 166 is coupled through three busses 180, 182, 184, each four bits wide, to the color generator 168. The output of the color generator 168 is a composite video signal to a television monitor or an r.f. signal to a standard television receiver or other similar display device.

The program memory 170 is operative to store instructions for MPU 162. The program memory map, flow charts and program listing are contained in Appendix B hereto, which is incorporated herein by reference. The primary function of MPU 162 is to interact with control of the I/O unit 160 and with the color memory 166 and picture memory 164 to select and generate a suitable color signal from the color generator 168 to display device 10.

During the active picture portion of the television frame, the picture matrix memory 164 and the color memory 166 operate under control of the address generator 174 to provide information to generate the video image. At the same time the MPU 162 can perform other functions. Input/output access is provided to the picture matrix memory 164 and to the color memory 166 only during the vertical blanking periods of the video signal generated by the system timing circuitry 176. During the remainder of the video signal generation period, operation is under the program control of picture address generator 174.

A major problem in any stored image color video system is the provision of both good spatial resolution of the stored image and good graduation of the color scale over a broad dynamic range. For example, according to prior art digital techniques, it would require 12 bits of information to fully define one picture element composed of three independently definable primary colors each of 16 levels. Moreover, in a matrix of 64 by 48 = 3072 picture elements, 36,864 bits must be stored for each image. The 12 bit color word size can contribute significantly to overall system complexity if the entire color word is stored in a picture matrix memory. However, by storing the color information in a separate memory with a proportionately much smaller address range, as according to the present invention, the color scale can be specified substantially independently of resolution and without substantially increasing the complexity of the system.

According to the invention, therefore, the picture matrix memory 164 contains only pointers or indices pointing to a digital description of the unique colors of each picture element. The color description is stored in the digital color memory 166, which is a relatively small, high speed bipolar memory. The picture matrix memory 164 contains, therefore, typically a three or four bit word identifying the location of luminance, chrominance and saturation information (or alternatively information on the three primary colors), stored in the form of 12-bit words in the physically separate digital color memory 166.

As previously indicated, there are many advantages to the use of a color memory intermediate of the stored image and the display. First of all, it allows the use of less expensive memory components. For example, the picture matrix memory 164 of the preferred embodiment is an array of three 1024×4 bit Type 4804 integrated circuits and the color memory 166 is an array of three 16×4 bit Type 7484 integrated circuits. A comparable architecture employing a single memory would require at least three times the memory capacity of this embodiment.

Second, the use of two-memory architecture enhances throughput without adding substantially to cost. In a system according to the invention, throughput may be limited by the speed of color memory access. The color memory 166 is selected for its short access time characteristic. Its limited size helps to minimize overall cost.

Third, the use of a separate color memory enables all colors identified by a single reference to be modified simultaneously without disturbing the contents of the picture matrix memory. This feature greatly facilitates manual control of color image formation, that is, the painting of an image.

And, fourth, where bit rate may be a limiting factor, as in band-limited data transmission, the use of a separate memory architecture can substantially reduce the bit rate required to fully describe each picture element with equivalent resolution and color scale. The total number of colors possible in any single image is limited only by the word length of the picture matrix memory 164.

Turning now to FIGS. 6A and 6B, the microprocessor based color controller 12' is illustrated in greater detail. (Elements are numbered the same as in FIG. 5). Referring to FIGS. 6A and 6B, there is shown the input/output unit 160 comprising an x-y joystick controller 200 coupled through analog-to-digital converter (ADC) 202 (for horizontal or right direction control) and ADC 204 (for vertical or down direction control) to a stick position register 206. The output of the stick position register 206 is provided by an 8-bit data bus to the data input of the MPU 162. The I/O unit 160 includes other functional capabilities such as a joystick address decoder 212 coupled to the stick position register 206, user accessible control switches 214 for operating the I/O unit 210, an auxillary input, for providing access to the programmable I/O unit 210 for future expansion, 216. The auxilary input 216 may be used, for example, to provide program data to modify system software or to interface additional joysticks and a cassette recorder interface 218.

The microprocessing unit MPU 162 comprises a Model 6800 or equivalent microprocessor. The Model 6800 microprocessor is manufactured by Motorola, Inc., of Phoenix, Ariz., as well as by other manufacturers.

Program instructions for operating the MPU 162 are stored in the program memory 170 which consists of a Read Only Memory for instructions (program ROM) 220 and a random access memory (RAM) 222 for data. The program ROM 220 is comprised of seven (or more) Model 1702A integrated circuits and the data RAM 222 comprises a pair of Model 6810A integrated circuits. A chip select controller 221 is interfaced with the program ROM 220. The controller 221 controls accss to the individual subsystems of the program ROM 220. A suitable device is the Model 74LS42 integrated circuit.

The system timing circuitry 176 includes a 14.3 MHz crystal controlled system clock 224, selected digital dividers 226, 228, 230 and 232, a two phase synchronized MPU clock 234 for controlling the MPU 162 and its associated subsystems and a television synchronizing generator (sync generator) 236. Timing line 238 from the sync generator 236 provides timing for the I/O unit 210 and real-time memory access, and also resets divider 232 to initial conditions once per line and once per frame so that picture matrix address generator 174 is properly initialized.

The buffers 172 comprise a data buffer 240, a picture address decoder 242 and an address buffer 244. The picture address decoder 242 is interfaced with the read/write (R/W) output of the MPU 162. Activation of the R/W output permits data to be transferred through the data buffer 240 to the picture matrix memory 164 and to the digital color memory 166. Because of timing line 238, activation of the data and the address buffers 240, 244 can only occur during the vertical blanking period. At all other times the outputs of both buffers are in a high impedance state.

The picture matrix memory 164 is organized into a 64 by 48 cell matrix, each cell for storing a four bit word. The color memory 166 is bipolar organized into 16 addressable locations corresponding to 16 different colors available for any one picture element. Each address in memory 166 defines a 12-bit color word; the color word is subdivided into three four-bit groups, each of the bit groups corresponding to one of the primary colors, red, green and blue. The color word is coupled in parallel via 12 data lines 180, 182, 184 to the color generator 168.

Color generator 168 comprises a digital-to-analog converter unit 248 consisting of a digital-to-analog converter for each of the three colors. The digital-to-analog converters are operative to translate the four bit primary color codes to analog values for input to color adder unit 250. The color adder unit 250 consists of color adders which generate standardized chrominance and luminance signals commonly designated R-Y, B-Y and Y. The outputs of the color adder unit 250 are provided to a color modulator 252 synchronized to the chrominance subcarrier output of the timing circuitry 176. A suitable color generator 168 for the present invention is described in Hill, "Synthetic Color Signal Generation and Control for TV Games and Other Simple Applications", 1976 Wescon Professional Program, Session 27 (Western Electronic Show and Convention). The publication is incorporated herein by reference and attached as Appendix C hereto.

Turning now to FIG. 7, there is shown a block diagram of the acoustic recording interface 218, which is coupled to the program I/O unit 210 (FIG. 6A). Herein the program I/O unit 210 is shown figuratively as a data recreate processor 210A and as a data record processor 210B, representing functions which may be implemented either as hardware or as a software routine. Suitable Record and Recreated software routines are disclosed in Appendix B attached hereto and incorporated herein by reference. The data record circuit elements of the interface 218 comprise a Frequency Shift Keyed (FSK), Tone generator 310 coupled to I/O unit 210 and hence to a software routine which keys the tone generator. Specifically, the tone generator 310 comprises first and second audio frequency relaxation oscillators 312 and 314, and the Record software routine is adapted to generate a data signal with superimposed clock signal. The Record software routine provides timing information regardless of the state of the data bit being transmitted by the technique of synchronously EXCLUSIVE ORing the periodic data clock with the data representing the image. The resultant data bit stream keys the tone generator 310. The FSK tone generator 310 drives the acoustic transducer 322 (a speaker with an impedance matching transformer).

The data recreate circuit elements comprise a phase locked loop (PLL) 316 coupled to receive FSK tone signals through the acoustic transducer 322, and operative to provide a DC error signal output proportional to the locked frequency and a reference signal output. The error signal output is coupled through a low pass filter (LPF) 318 to one input of a dual input comparator 320 while the reference signal output is coupled to the other input of the comparator 320. The output of the comparator 320 is a composite signal, that is, the EXCLUSIVE OR'd composite of the data clock and the data. The composite signal is coupled to a bidirectional, non-retriggerable, one-shot multivibrator 324 whose period is arranged to be ⅜ths of the period of the data clock. The multivibrator, thus, ignores data transitions and is triggered only by the data clock transitions. The composite signal and the data clock are coupled to the I/O unit 210 which processes these signals to extract the data signal by means of the Recreate software routine set forth in Appendix B.

The Record routine includes a five second preamble to provide the user with a sufficient time interval to activate the recreate mode. In addition, the status of the record push button and recreate push button is checked once per phase of the data clock (which is derived from software timing routines) so that the Record or Recreate routines can be aborted at any time. A suitable data transmission rate is 50 to 100 baud.

The audio acoustic coupling and asynchronous data transmission and recovery feature greatly facilitate the storage and generation of images in that any generally available audio recording apparatus can be used to record and reproduce images.

The system described in FIGS. 4 through 6 operates as follows. Joystick 200 is manipulated manually to generate the x-y address of the picture elements desired to be modified. Angular displacement of the moveable handle of the joystick from a neutral vertical position in any azimuthal direction causes a proportionate change in the angular position of shafts of two orthogonally-disposed potentiometers within the joystick, resulting in resistance changes in a timing circuit of a one-shot multivibrator associated with each axis of the joystick. The multivibrator pulses from analog-to digital converters 202 and 204 are used in sequence to gate the flow of clock pulses into position register 206. Triggers for initiating the digital-to-analog conversion are derived from decoding two unique addresses of the picture matrix address generator 174 during the active picture portion of a frame. Each axis of the joystick is read out once each field. An interrupt is generated after each timing gate which initiates read-out of the stick position register 206. The data so obtained is provided directly to the MPU data bus 208. The data is first stored and then it is smoothed in a software routine by computing a running average based on a geometrically declining weighted average of previous samples. Smoothing insures smooth apparent brush motion in the displayed image. The smoothed data is used to address the picture matrix memory 164 to write in data corresponding to the address of the selected color, which is separately stored in color memory 166.

The control switches 214 provide two operator-selectable modes for carrying out the data transfer into the picture matrix memory, namely a paint mode and a sketch mode. In the paint mode, a new color pointer simply replaces data previously stored in the designated location of picture matrix memory 164, thereby making a nonrecoverable change in the picture matrix data. In the sketch mode, only the instantaneous position of the brush or joystick is marked by a cursor indicator of the selected palette color, and the original color is returned to the location vacated by the cursor as the cursor advances across the image matrix. This effect is accomplished by temporarily transferring data currently at the picture matrix memory location "pointed to" by the joystick-derived data to the program memory 170. After a new picture matrix memory location is selected by the joystick data, previous matrix data is transferred back to its original position.

Data transfers to the color memory 166 occur only during the vertical blanking period of the image scan, as determined by the TV sync generator 236. External data is transferred through control switches 214 defining one of 16 discrete color levels of red, green and blue. The control switches 214 provide color adjustment by incrementing or decrementing through the range of available color values. Since the output of the color memory 166 is not accessible to the MPU 162, an image of the contents of the color memory 166 is maintained at all times in the RAM 222, and it is this image which is altered by the control switches 214. The color which has been selected is updated in the color memory 166 once each frame.

Lines 180, 182, 184 transfer data from the color memory 166 to the color generator 168 when addressed by the picture matrix memory 164 in the course of scanning the picture matrix stored in the picture matrix memory 164. Each four-wire bus line is coupled to a single digital-to-analog converter (not shown) in converter unit 248 which translates the four bits of digital information to an analog signal value for driving the color adders 250. The data transfers to the individual digital-to-analog converters for each picture element are updated each 840 nanoseconds for a picture matrix composed of 64 by 48 elements.

The color adder 250 comprises six operational amplifiers, or similar means, which generate the color difference signals and luminance signals for a composite signal. A balanced modulator technique is employed in the color modulator 252 as set forth in the article in E. D. Hill, "Synthetic Color Signal Generation and Control for TV Games and Other Simple Applications", published as part of the 1976 WESCON Professional Program, Sept. 14, 1976, which is incorporated herein by reference.

The TV sync generator 236 is a model MM 5320 integrated circuit. The sync generator 236 produces all necessary television raster signals including a color burst gate as explained below.

To generate accurate colors, it is necessary to provide a signal having reference phase at the beginning of each line. For this purpose a reference color burst is generated by introducing a voltage pulse at the proper time, as regulated by the TV sync generator 236, to the negative input of a B-Y color difference amplifier within the color adder unit 250. Composite synchronization signals to the adder unit 250 and vertical drive signals to the I/O unit 210 are also obtained from the TV sync generator 236. Details of the operation of the TV sync generator 236 are found in pages 4-6 through 4-11 of the MOS/LSI Date Book published by National Semiconductor Corporation, Santa Clara, Calif., 1977.

The composite video signal is available via output 260, and it may be applied directly to the video input of a color monitor, or it may be modulated on a radio frequency carrier by means of an RF modulator and oscillator 256 and provided as a modulated VHF signal at output 262 to the VHF antenna terminals of a standard home television receiver.

To facilitate the generation of block or background colors, a "one color" mode is provided. In the one color mode, the index or pointer selected color is sequentially loaded into each memory location of the picture matrix memory 164. This operation occurs automatically without activation of the joystick paint brush. The one color mode automatically terminates at the end of the background painting operation. However, during operation of one color mode, which may be several seconds, all other operational switches are disabled.

In order to allow the user to view all available colors a palette function is provided. The palette comprises a momentary display of all colors overlaid on the image in horizontal bars. Internally, the contents of the color register are displayed directly on the output device without reference to the designated picture data. Picture data is obliterated by the palette bars, however. In order to preserve the obliterated picture data, it is compacted and temporarily stored in the data RAM 222.

In the palette mode of operation, data transfers are limited to two picture elements per vertical blanking period in order to accomodate program interruption resulting from the relatively complex palette data transfers. In particular, picture data is first transferred out of the picture matrix RAM 164 into the RAM 222. (The RAM 222 is also used to maintain a current status file on the contents of the color memory.)

The selected color of the displayed palette is denoted by what is called a palette pointer. The palette pointer is display information generated separately from the palette bars. The palette pointer appears as a horizontal extension of the palette bar of the selected color.

Remotely controlled electronic painting presents a novel problem of identifying the location of the remote brush within the displayed image. Absent some indicator of brush or cursor location, the only means for locating the cursor is by means of the trail left on the image as a result of its movement. There is therefore provided, according to the invention, a mechanism to visually indicate the current cursor location within the display image. Specifically, the picture element at the current cursor location, is caused to flicker or alternate between a non-selected color and the selected color. The feature is called a "blinker brush", and it is implemented by invariably storing picture matrix data corresponding to the current brush position in a temporary random access memory location set aside for the current brush position (in the program RAM 222), comparing (under microprocessor control) previous and current picture data at the subject location to detect a change in brush position, transferring data representing the selected color to the picture matrix RAM 164, periodically substituting for a brief interval the data representing a non-selected color for the data representing the selected color in the subject location of the picture matrix RAM 164, then restoring the selected color data to cause a flicker, and, upon detection of a change in cursor position away from the subject location, either storing the selected color data in the subject location of the picture matrix RAM 164 (and thus permanently "painting" the selected color) or restoring the previous color data to the subject location in the picture matrix RAM 164 (and thus temporarily "sketching" the selected color as the brush cursor is moved). Thus, for each cursor position, there exist three possible color values, namely, the current selected color, the previously stored selected color and the non-selected color. The "sketch" or "paint" operation is specified by selection of the sketch or paint mode, as previously discussed.

In the preferred embodiment, described in detail in Appendix B, the non-selected color data is restored in the displayed image for an interval of one frame each sixteen frames, which creates a slight flicker in the selected color display sufficient to identify cursor position.

Another feature of the invention is an aid to blocking in large areas of one color. Called brush size control, the cursor is provided with an ability to increase its effective size from a single matrix element to a multiple matrix element size. The most efficient cursor shape for this purpose is that of an L or inverted L, since this shape minimizes the amount of data which must be transferred into the picture matrix for image display. In the preferred embodiment the cursor size may extend up to sixteen matrix elements on a side.

To further minimize the amount of required data transfer in the sketch mode of operation, only three matrix elements are employed, namely, the vertex and the two end points of the cursor shape.

The brush size control is implemented upon actuation of designated switches on the control panel 12' (FIG. 2). For example, the brush size control may be actuated by simultaneous actuation of the Record and Recreate switches and the actuation of the Red switch. The Red switch increments or decrements cursor size under timer control just as color value is incremented or decremented.

HIGH RESOLUTION VERSION

The invention as thus far described has been directed to a display apparatus having a 64×48 picture element matrix. In advanced applications, it is desirable to provide image resolution approaching that of conventional broadcast television in a matrix memory-based system having each picture element independently definable. The following is a description of a high resolution version of the digital memory controller previously described.

According to the invention, a high resolution image is produced by digitally averaging the color intensity of the currently displayed image element over a plurality of immediately previously displayed image elements. This permits effective use of a large, and thus a high resolution, picture matrix memory.

The technique has several advantages. Digital image averaging for a finite duration is superior to analog averaging (low pass filtering) because it reduces the duration of the transient response. Further, element averaging reduces spectral energy content in proportion to the number of matrix elements which are averaged together.

Still further, the technique minimizes objectionable color "staining" which normally results from large color transitions. By minimizing color staining, the number of separately definable horizontally spaced elements can be increased.

A still further advantage to the technique is its generation of the standardized NTSC output signal capable of directly interfacing with NTSC image processing equipment. Specifically, means are provided for maintaining a wide bandwidth luminance signal which also enhances image sharpness.

FIG. 8 is a block diagram of a portion of the Digital Memory Version (FIG. 6) as modified for high resolution image reproduction. Specifically, an improved color generator 168' is illustrated which incorporates digital averaging capability. An address generator 399 performs substantially the same function as the picture matrix address generator 174 in the previously described digital system. The column clock corresponds to the line labeled 1.19 MHz in FIG. 6B, except in this version the frequency is 4.76 MHz, and the row clock corresponds to the timing line 238.

The address generator 399 is coupled to the picture matrix RAM 164 address bus 171. The address lines of the picture matrix RAM 164 are coupled in parallel to Red, Green and Blue submemories of the color memory 166. Each of the three submemories is coupled through a four-line bus to a separate group of shift registers 400A, 400B and 400C. Each group of shift registers consists of four serially coupled stages of four parallel signal paths. The outputs are arranged to be accessible as sixteen parallel outputs as indicated by the bus lines at the top of shift register 400A. The sixteen outputs are then coupled through two stages of dual parallel four bit adders 410A, 410B and 410C, which have been adapted to produce the average of four consecutive four-bit values at selected output terminals. Specifically, division by 4 is accomplished by ignoring the least two significant bits of the output of the least significant summer. The averaged output is then coupled to the color digital-to-analog converters 248A, 248B and 248C, each of which is in turn coupled to a color adder unit 250'. The color adder unit 250' combines red, green and blue values into R-Y and B-Y signals according to the NTSC format.

The Y or luminance signal is not derived from color adders 250'; instead, an unaveraged or broadband Y signal is generated from the output of the second stage of each of the four parallel shift registers 400A, 400B and 400C. Specifically, each four-bit second stage output of the shift registers 400A, 400B and 400C is coupled to a separeate four bit multiplier, 420, 422 and 424 which is adapted to weight the respective colors according to the NTSC signal standard. The weighted outputs are then coupled to parallel adders 426 and 428 to produce a four-bit summed output, which is then coupled to a digital-to-analog converter 430. The digital-to-analog converter 430 is a high speed type adapted to generate a wideband analog luminance signal (4.5MHz)

The R-Y, B-Y and wideband Y signals are coupled to the color modulator 252 (FIG. 6) in order to create the composite video output.

In operation, each bit of data representing a primary color is loaded from the color memory 166 into the four corresponding parallel shift registers 400A, 400B and 400C. The shift registers 400A, 400B and 400C are synchronously clocked through the column clock line. Hence, at any instant, each group of four shift registers contains the current color value plus the three previous color values. The four-bit color values are then added and the least two significant bits are discarded to effect a division by four. The consequent output is the running average of four consecutive column picture elements. The averaged data then drives the digital-to-analog converters 248A, 248B and 248C, the resulting analog output signals being summed in the color adder unit 250'.

The luminance or Y signal is derived from the color memory 166 after undergoing a two unit shift register delay to center the luminance signal in the middle of the running average of the color signals. The luminance signal is weighted by four bit digital multiplication according to the standard formula $Y=0.3R+0.59G+0.11B$. This is accomplished by discarding the four most significant bits of the four bit multipliers to effect a division by sixteen, and then multiplying the closest appropriate fractional weighting factor, namely Red being 5/16, which is about equal to 0.3, Green being 9/16, which is about equal to 0.59, and Blue being 2/16, which is about equal to 0.11.

The weighted color values are thereafter added, and the sum is converted to analog form. The output is a luminance signal Y having a bandwidth on the order of 4.5MHz. The bandwidth of the luminance signal largely dictates the resolution in the displayed image.

It can be shown that digital time averaging is superior to analog filtering at the analogous bandwidth. In an analog network, the transient response does not converge to a final value as quickly as the transient response of a digital network having the corresponding bandwidth. In effect, digital averaging is achieved over four periods so that no transient response is permitted to extend more than four periods. In an analog network, however, convergence time is approximately fifty percent greater. The result is objectionable color staining particularly noticeable following large chrominance transitions.

It has been determined that the spectral energy content for frequencies above the column clock frequency is reduced substantially as a consequence of finite duration averaging. A step change in an averaged signal has been computed to contain only 26.5% of the spectral energy of a non time-averaged signal. A digitalized color image with individually addressable elements approaching the resolution of a conventional television receiver can therefore be achieved within the bandwidth and hardware constraints of present technology. In particular, a matrix of 265 columns by 242 rows, or 61,952 elements or words of memory is resolvable in a useable image. A wide bandwidth luminance signal as herein generated further enhances fine detail in the reproduced image.

In summary, a synthetic color signal generating and control apparatus has now been described for remotely painting images on the screen of a conventional color television receiver or a video monitor. The invention embodies a new, versatile and inexpensive artistic medium particularly for creative entertainment. Systems fabricated according to the invention enable a human operator to develop and exercise the skills of a brush artist using a conventional color television set. The operator/artist is permitted to create a work of art of selected colors in an erasable medium, to adjust colors without changing image spatial definition, to view all available colors simultaneously, to locate and remotely control a cursor or "brush" by means of a blinking indicator, to adjust the operational size of the cursor, to quickly and automatically generate a background color, to record the image for preservation or later modification, to reproduce the image, and to transmit the image by conventional telephone or even radio channels to remote locations equipped with a compatible system and to do so by means of simple acoustic coupling. Specific embodiments of these inventive features have been described in detail herein. Other embodiments will be obvious to those of ordinary skill in the art in light of this disclosure. It is therefore not intended that the invention be limited except as indicated by the appended claims.

I claim:

1. A system for generating electronic signals representing an original color video image for display in a conventional video signal color display device such as a television receiver, said system comprising:
   means for producing said electronic signals for display in response to color value input signals;
   first memory means coupled to said signals producing means and having first memory elements, said first memory elements being constrained to store only a representation of a single preselectable color value for display;
   second memory means coupled to said first memory means and through said first memory means to said electronic signals producing means, said second memory means having second memory elements, said second memory elements corresponding to matrix locations of said video image, said memory elements being constrained to store only a representation of a single preselected matrix image value which designates a single one of said first memory locations; and
   cursor means for manually generating said matrix image values in said second memory means independently of said color values such that each one of said image matrix locations is assigned a color value by reference to said first memory locations.

2. A system according to claim 1 wherein each one of said matrix image values comprises digital representations of memory addresses of a single one of said color values and wherein said electronic signals producing means is operative to scan said second memory elements and in response to the matrix image values stored therein to generate a signal corresponding to said color values stored in said first memory elements of said first memory means.

3. A system according to claim 1 or 2 further including a programmed microprocessor system coupled to said cursor means, to said first memory means and to said second memory means, wherein said signals producing means comprises a modulation and synchronization means and wherein said first and second memory means are adapted to store said color values and matrix image values in digital form.

4. A system according to claim 1 or 2 further including means for varying said color values independently of said matrix locations of said video image.

5. An apparatus according to claim 1 or 2 wherein said matrix image value generating cursor means comprises a joystick coupled through said signals producing means to said second memory means and operative to cause storage of preselected matrix image values in said second memory elements.

6. A system according to claim 5, and further including analog-to-digital converter means coupled to the output of said joystick; and means for uniquely identifying output signals of said joystick with a pre-selected operating interval of said joystick.

7. A system according to claim 1 or 2 wherein said signals producing means includes an oscillator and a modulator for producing a modulated television carrier signal adapted for coupling to input terminals of a standard television receiver.

8. A system according to claims 1 or 2 further including means for simultaneously generating an ordered visual display of all color values stored in said first memory means.

9. A system according to claim 8 further including means for indicating the selected one of said color values which is under control of said cursor means.

10. A system according to claim 1 or 2 further including means for identifying the location of said cursor means in the displayed color image.

11. A system according to claim 10 wherein said location identifying means comprises means for causing the matrix image element at the position of said cursor means to alternate between a selected color and another color.

12. A system according to claim 1 or 2 further including means for designating the image size of said cursor means relative to the overall size of said video image.

13. A system according to claim 1 or 2 wherein said second memory means comprises a serial shift register.

14. A system according to claim 13 wherein said second memory means further includes auxiliary memory means for refeshing said shift register and control means for synchronizing data in said shift register with predetermined locations of said matrix image.

15. A system for generating electronic signals representing an original color video image adapted for display in a conventional video signal display device, said system comprising:
first memory means for color values;
second memory means for matrix image values uniquely designating locations of said color values in said first memory means such that each element of said matrix image is assigned a color value;
means for varying said color values independently of said matrix image wherein said color value varying means comprises means for independently adjusting the components of a color vector of each element of said color values, the color vector comprising a hue value element, a saturation value element and a luminance value element;
cursor means for manually generating said matrix image values in said second memory means; and
means responsive to said values in said second memory means and said first memory means for producing said electronic signals.

16. A system according the claim 15 wherein said color value varying means are continuously variable.

17. A system according to claim 15 wherein said color value varying means are discretely variable.

18. A system according to claim 15 further including means for transmitting and receiving an audio signal representation of said matrix image.

19. A system according to claim 18 wherein said audio signal transmission and receiving means comprises means for transmitting and receiving a plurality of audio tones.

20. A system according to claim 18 wherein said transmitting and receiving means further include an acoustic transducer for acoustically transmitting and receiving said audio signals.

21. A system for generating electronic signals representing an original color video image adapted for display in a conventional video signal display device, said system comprising:
first memory means for color values;
second memory means for matrix image values uniquely designating location of said color values in said first memory means such that each element of said matrix image is assigned a color value;
means for digitally averaging the color values of consecutively display image elements wherein said digital averaging means comprises a plurality of parallel shift registers adapted to accumulate separate consecutive digital values of each of the components of the color vector, means for adding said digital values, and means for dividing said digital values to produce a running average of said digital values;
cursor means for manually generating said matrix image values in said second memory means; and
means responsive to said values in said second memory means and said first memory means for producing electronic signals.

22. In combination with a television receiver, apparatus for producing a color video image under manual control for display on the television receiver, said apparatus comprising:
first memory means constrained to store a set of color values;
second memory means constrained to store a two-dimensional matrix image, said matrix image comprising indices for uniquely identifying elements of said color values set;
manually controllable means for registering said indices in said second memory means;
manually controllable means for defining said color values of said color values set independently of said matrix image;
means for generating a raster signal for defining a video resolution element and for synchronizing the apparatus with the television receiver, said raster generator including means for generating synchronization signals and blanking signals for interfacing with the television receiver; and
means responsive to first memory means containing said color values set, said matrix image only through said first memory means and said video resolution element generating means for generating a composite color video signal at input terminals of the television receiver.

23. An apparatus according to claim 22 wherein said raster generator further comprises means for producing horizontal line timing; means for producing vertical timing; means for producing horizontal blanking in synchronism with horizontal line timing; and means for producing vertical blanking in synchronism with vertical timing.

24. An apparatus according to claim 23 wherein said raster generator further includes means for generating a horizontal blanking interval; and
means for generating a reference color signal level during the second half of said horizontal blanking interval.

25. A method for creating an electronic signal representation of a visually displayable video color image under manual control comprising the steps of:
preselecting and storing a set of codes representative solely of image forming values in a first memory means, said values being independent and without reference to location in said color video image;

generating values representative solely of a matrix image, said matrix image comprising indices uniquely identifying locations of selected ones of said image forming codes in said first memory means;

storing said matrix image values in second memory means; and generating a color video signal in response to said matrix image and said set of codes by causing a scanning of said second memory means to retrieve said indices and in response to said indices to access a code so designated and to generate a signal representative of said image forming values at corresponding regions in said color video image for input to input terminals of a video display means such as a television receiver.

26. A method according to claim 25 wherein said values generating step comprises serially generating the indices by means of a remotely controllable manual input means.

27. A method according to claim 25 or 26 wherein said values generating step further comprises transferring signal representations of said indices to said second memory means in response to an audio frequency encoded signal.

28. A method according to claim 25 for indicating the position in the displayed matrix image of a values generating step representing a cursor, said method comprising the steps of:

storing the matrix image value corresponding to the cursor current position in a temporary memory loaction set aside for the current position;

comparing previous and current matrix values at the corresponding location is said second memory means to detect a change in said designated position;

transferring the current selected color value to said second memory means and periodically substituting for a brief interval a nonselected color value for the current selected color value in said location of said second memory means and periodically restoring the current selected color value; and, upon detection of movement of the cursor away from the current position, finally transferring a further designated color value to said corresponding location in said second memory means.

29. A method according to claim 28 wherein said final transferring step comprises storing the current selected color value in the designated location of said second memory means.

30. A method according to claim 28 wherein said final transferring step comprises restoring the previous selected color value to the designated location of said second memory means.

31. A method according to claim 25 or 26 wherein said first and second memory means are digital and are stored in digital form in said first and second memory means.

32. A method according to claim 25 or 26 further including the optional step of automatically generating a matrix image consisting of only one of said color values.

33. A method according to claim 25 or 26 further including the optional step of simultaneously generating an ordered visual display of all color values stored in said first memory means.

34. A method according to claim 33 further including the step of indicating the selected one of said color values.

35. A method according to claim 33 further including the step of restoring matrix image values upon termination of said step of generating all color values.

36. A method according to claim 35 comprising the steps of separately accumulating consecutive digital values of each component of said color vector, adding like components, and dividing the sum by the number of values accumulated to produce a running average color value for generation of a video image.

37. A method for creating an electronic signal representation of a visually displayable video color image under manual control comprising the steps of:

storing a set of color values in a first memory means;

generating values for a matrix image, said matrix image comprising indices uniquely identifying locations of said color values in said first memory means;

storing said matrix image values in second memory means;

adjusting the components of the color vector of each of said color values independently of the matrix image, the components of the color vector comprising a hue value element, a saturation value element and a luminance value element; and generating a color video signal in response to said matrix image and said set of color values adapted for input to input terminals of a video display means.

38. A method for creating an electronic signal representation of a visually displayable video color image under manual control comprising the steps of:

storing a set of codes representative of image forming values in a first memory means;

generating values for a matrix image, said matrix image values comprising indices uniquely identifying locations of selected ones of said codes in said first memory means;

storing said matrix image values in second memory means;

digitally averaging color vector components of consecutively-ordered image forming elements over a defined interval; and generating a color video signal in response to said matrix image and said set of codes and averaged color vector components for input of an image having enhanced image definition of consecutively-displayed image element.

* * * * *